March 10, 1925.  1,529,608

P. G. PAGEL

SCOOTER

Filed Oct. 26, 1922

Inventor
Paul G. Pagel.
By Hazard and Miller
Attorneys

Patented Mar. 10, 1925.

1,529,608

UNITED STATES PATENT OFFICE.

PAUL G. PAGEL, OF LOS ANGELES, CALIFORNIA.

SCOOTER.

Application filed October 26, 1922. Serial No. 597,003.

*To all whom it may concern:*

Be it known that I, PAUL G. PAGEL, a citizen of the United States, residing at Los Angeles, in the county of Los Angeles and State of California, have invented new and useful Improvements in Scooters, of which the following is a specification.

This invention relates to power transmitting mechanism and especially to a novel mechanical movement adapted to be readily incorporated in vehicles of various types.

It is an object of the invention to provide an extremely simple, practicable, substantial and effective type of transmitting mechanism. Another object is to provide a mechanically propelled child's vehicle or scooter.

Other objects and advantages will be made manifest in the following specification of an embodiment of the invention illustrated in the accompanying drawings, wherein—

Figure 1:
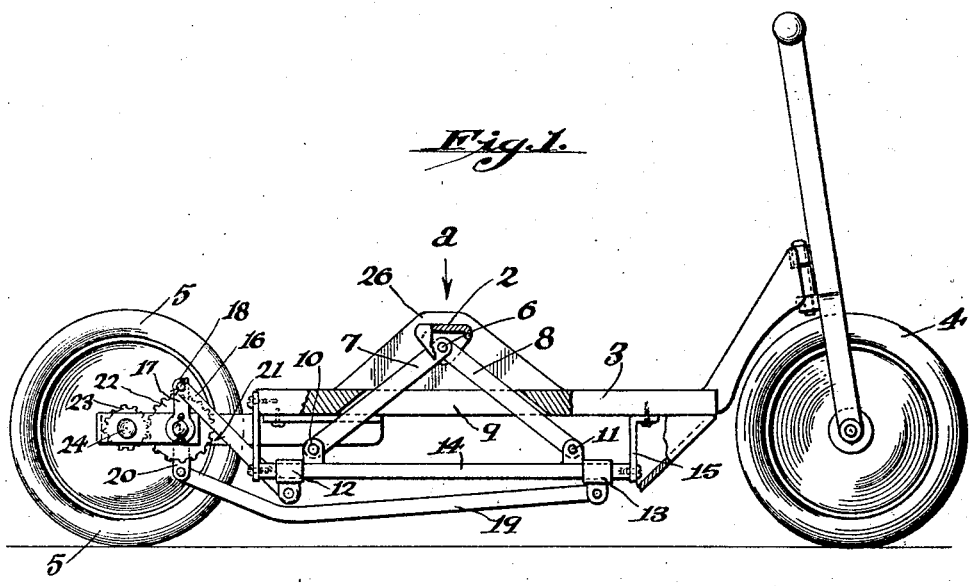
Figure 1 is a side elevation and partial section of the device embodying the invention.

The present invention embodies mechanism for translating a rectilinear movement into rotary movement, and more particularly consists of a reciprocating driving member for actuating a plurality of cranks connected to a rotating member.

The mechanism includes an impulse receiving member 2 which in the present case is represented as a foot pedal to be operated by the rider of a vehicle having a suitable bed or platform 3 supported on a front steering wheel 4 and a rear driven wheel 5. The pedal is shown as connected pivotally at 6 to convergent ends of links 7 and 8 which extend through an aperture or slot 9 provided therefor in the vehicle body 3. The lower divergent ends of the links are pivotally connected at 10 and 11 to respective slides 12 and 13. These slides are adapted to reciprocate upon a guide rail 14 suitably supported as by brackets 15 on the body 3.

Figure 2:
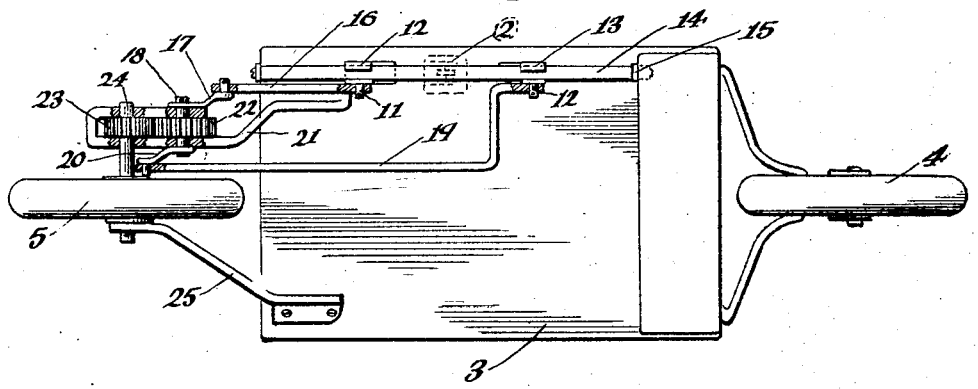
Fig. 2 is a bottom plan and partial section of the device.

One of the slides as 12 is connected by a link 16 to a crank 17, Fig. 2, fixed on a crank shaft 18 and the other slide 13 is connected by a link 19 to a crank 20 on the crank shaft 18. This crank shaft is mounted in a suitable bearing 21 and is shown as provided with a gear 22 which meshes with a gear 23.

The gear 23 is fixed on a countershaft 24, one end of which is supported in the bearing 21 and the other in a bearing 25; these bearings being shown as secured to the bottom of the vehicle body 3 and projecting rearwardly therefrom.

The cranks 17 and 20 are shown as diametrically opposed.

In the operation of the mechanism, when the driving member 2 is given an impulse in the direction of the arrow $a$, Fig. 1, the links 7 and 8 are driven downwardly and diverge and thus drive the slides 12 and 13 away from each other along the guide rail 14. The slides, being connected by their links to the cranks 17 and 20, therefore impart a driving force to the cranks, and the crank shaft 18 is rotated and the power is transmitted therefrom as to the countershaft 24 upon which is secured the rear driven wheel 5.

From this it will be seen that the driving energy is transmitted substantially without lost movement to diametrically opposite cranks on a crank shaft which are subjected one to a pushing and the other to a pulling impulse.

It is to be understood that the present transmitting mechanism is not limited to the type of vehicle shown and it may be combined with various other parts or mechanisms which are to be driven.

When the mechanism is embodied in a vehicle as here shown, it is desirable to protect the foot of the driver of the vehicle from being caught between the links 7 and 8 as they rise and fall toward the platform 3, which is here shown as arranged well below the tops of the wheels. Therefore, along the platform 3 there is provided a substantial guard 26 in the form of a plate extending upwardly beside the path of the driving pedal 2. The foot may be readily maintained in position upon the pedal and will slide along the contiguous side of the guard plate 26.

Further embodiments, modifications and changes may be resorted to within the spirit of the invention as here claimed.

What is claimed is:

1. In combination with a wheeled vehicle, guide means, slides mounted upon said guide means, divergent links having their remote ends connected to the slides and being mutually connected at their inner ends, said links being provided with a driving element, a driven shaft for a wheel of the vehicle, and transmitting connections between said driven shaft and the slides.

2. In combination with a wheeled vehicle, guide means, slides mounted upon said guide means, divergent links having their remote ends connected to the slides and being mutually connected at their inner ends, said links being provided with a driving element, a driven shaft for a wheel of the vehicle, and transmitting connections between said driven shaft and the slides, the vehicle having a platform, and said driving element being so arranged above the platform that it may be actuated by a rider of the vehicle.

3. In combination with a wheeled vehicle, guide means, slides mounted upon said guide means, divergent links having their remote ends connected to the slides and being mutually connected at their inner ends, said links being provided with a driving element, a driven shaft for a wheel of the vehicle, transmitting connections between said driven shaft and the slides, the vehicle having a platform, said driving element being so arranged that it may be actuated by a rider of the vehicle on the platform, and guard means on the platform contiguous to the operating links.

In testimony whereof I have signed my name to this specification.

PAUL G. PAGEL.